United States Patent
Palacios Durazo et al.

(10) Patent No.: US 8,201,737 B1
(45) Date of Patent: Jun. 19, 2012

(54) VALIDATING ITEM PLACEMENT

(75) Inventors: Ramon A. Palacios Durazo, Issaquah, WA (US); Peter D. Rowley, Sammamish, WA (US); Riyadth F. Al-Kazily, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 433 days.

(21) Appl. No.: 12/506,501

(22) Filed: Jul. 21, 2009

(51) Int. Cl.
*G06F 19/00* (2011.01)
(52) U.S. Cl. ................................ 235/385; 235/383
(58) Field of Classification Search .................. 235/385, 235/383; 700/215
See application file for complete search history.

(56) References Cited

U.S. PATENT DOCUMENTS

| | | | | |
|---|---|---|---|---|
| 4,676,343 | A * | 6/1987 | Humble et al. | 186/61 |
| 5,640,002 | A * | 6/1997 | Ruppert et al. | 235/462.46 |
| 8,037,969 | B2 * | 10/2011 | Curt et al. | 186/41 |
| 2004/0069849 | A1 * | 4/2004 | Stevens et al. | 235/385 |
| 2009/0299521 | A1 * | 12/2009 | Hansl et al. | 700/215 |

* cited by examiner

*Primary Examiner* — Daniel Hess
(74) *Attorney, Agent, or Firm* — Thomas, Kayden, Horstemeyer & Risley, LLP (57) ABSTRACT

Disclosed are various embodiments for validating item placement. An item is placed on a platform. A load cell is configured to measure weight applied to the platform. Placement of the item in a correct one of a plurality of container positions on the platform is verified. The verification is based at least in part on a positional requirement associated with the item, a weight associated with the item, and the weight detected by the load cell.

31 Claims, 7 Drawing Sheets

VALIDATING ITEM PLACEMENT

BACKGROUND

In a materials handling facility, such as a fulfillment center, agents called "pickers" are employed to remove items from storage locations in the facility so that, for example, the items may be shipped to another location. Sometimes pickers misplace items, which may result in shipments omitting correct items or including incorrect items.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

In a materials handling facility, such as a fulfillment center, pickers are assigned the task of removing a group of items from storage locations in the facility and placing them in sortation containers. As non-limiting examples, the group of items may represent an order, a shipment within an order, items from one or more orders that are destined for gift wrapping, items from one or more orders that have a certain fragility, items from one or more orders that are of a certain weight, items that require any other special processing, or any other logical grouping of one or more items. Pickers may be assigned to pick items for multiple groups of items at the same time. To this end, a picker may use a cart capable of carrying multiple sortation containers.

A computer system that generates shipping manifests may direct the activity of the pickers within the materials handling facility. The computer system may generate an optimum route for pickers who are selecting items for multiple orders. The optimum route provides for minimum movement for the picker for maximum efficiency. For example, the manifest may direct a picker to a specific location in the storage center to retrieve an item from a bin for a first order. Then, the manifest may direct the picker to a nearby location to retrieve an item from another bin for the second order. The picker is to put each item in the correct sortation container so that each item can be matched with its correct respective group of items. In some embodiments, items are assigned to sortation containers based on one or more rules. As a non-limiting example, items to be shipped in a special type of corrugation may need to be placed in a common sortation container. Other examples of rules may include items that are to be gift wrapped, items that are especially fragile, and other rules.

Sometimes, however, a picker may not place the item in the correct sortation container, even with manual safeguards such as, for example, scanning identifiers on the item, sortation container, and/or other safeguards, due to possible human error. The various embodiments disclosed herein permit multiple containers on a cart or other structure to be measured by a single load cell. Further, various systems automatically identify the positions of sortation containers on the cart and automatically identify which item is being placed in which sortation container. In the following discussion, a general description of the system and its components is provided, followed by a discussion of the operation of the same.

Figure 1:
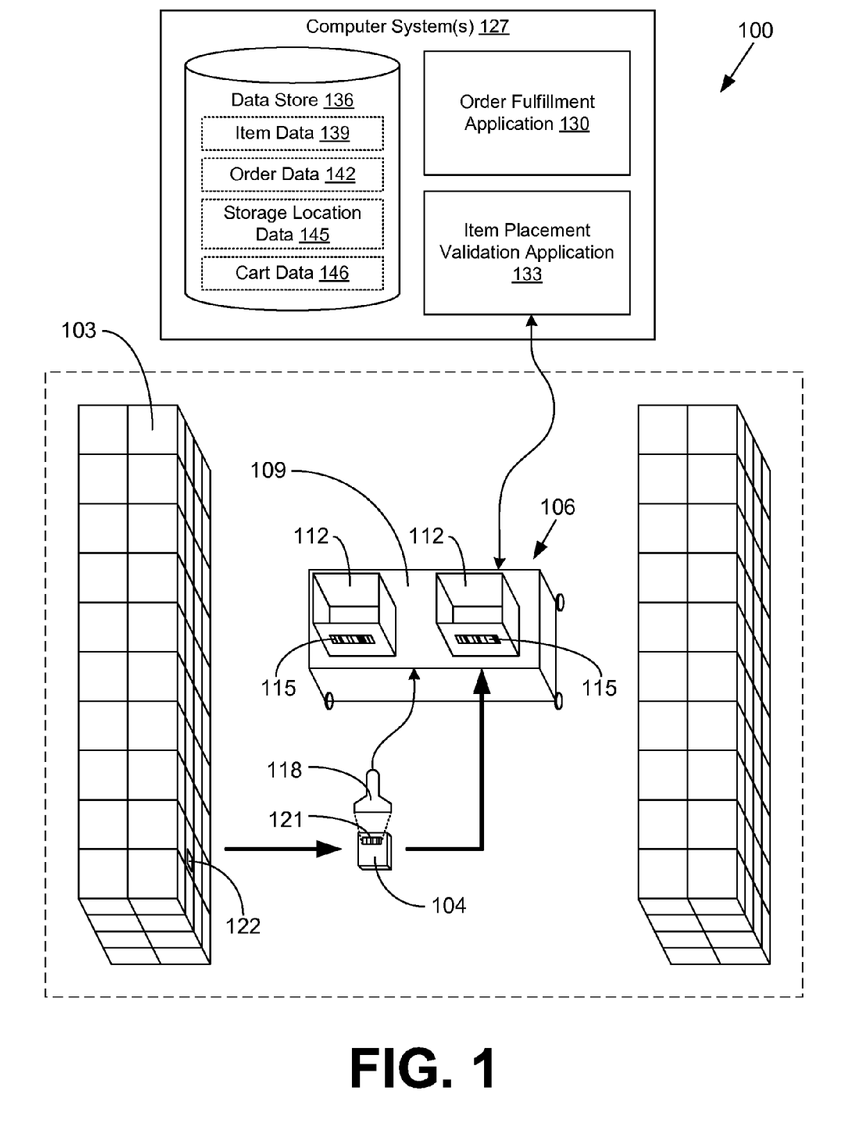
FIG. 1 is a drawing of a materials handling facility according to various embodiments of the present disclosure.

With reference to FIG. 1, shown is a drawing that depicts one example of a materials handling facility 100 according to various embodiments of the present disclosure. The materials handling facility 100 may include one or more of, but is not limited to, warehouses, distribution centers, cross-docking facilities, order fulfillment centers (also referred to as fulfillment facilities), packaging facilities, shipping facilities, or other facilities or combination of facilities for performing one or more functions of material (inventory) handling. Although the materials handling facility 100 is described herein with specific reference to a fulfillment center, it is understood that a materials handling facility 100 provides one example of many other types of environments to which the principles described herein apply.

According to the illustration provided herein, the materials handling facility 100 may comprise, for example, a large warehouse or other structure that includes a plurality of storage locations 103, such as bins, slots, shelves, containers, receptacles, crates, stalls, cribs, cordoned areas, or other locations, etc. Each of the storage locations 103 has a respective capacity. An inventory of items 104 is stored in the storage locations 103. In one embodiment, the materials handling facility 100 is configured to process orders for goods from customers. The inventory stored in the storage locations 103 is accessed to fulfill the orders from customers as might be the case, for example, where the materials handling facility 100 comprises a fulfillment center.

Where the materials handling facility 100 comprises a fulfillment center, pickers within the materials handling facility 100 perform the role of fulfilling orders for items 104 purchased by customers. Specifically, pickers perform the task of gathering, storing, or sorting items 104 from storage locations 103 in the materials handling facility 100 to fulfill orders for goods that are shipped to the customers.

In some fulfillment centers, pickers may use a cart 106 when retrieving items 104 from various storage locations 103 in the materials handling facility 100. The cart 106 may comprise, for example, a wheeled cart 106, a push cart 106, a motorized cart 106, a hand-carried cart 106, and/or any other type of cart 106. Each cart 106 is equipped with at least one platform 109. Although one platform 109 is depicted in FIG. 1, it is understood that cart 106 may have any number of platforms 109. A plurality of sortation containers 112 are disposed on each platform 109.

The platform 109 may have a substantially flat surface or may include surface features indicating positions where sortation containers 112 are to be placed. In various embodiments, the platform 109 may be modular, allowing for expansion in the number, shapes, and/or sizes of sortation containers 112 held by the platform 109 and/or other changes in the configuration of the platform 109. In one embodiment, the platform 109 comprises a modular interconnection of the sortation containers 112.

Each of the sortation containers 112 may comprise a tote, a bag, a bin, a box, and/or any other container configured to contain a group of items 104. Where the materials handling facility 100 is a fulfillment center, the materials handling facility 100 may process orders, and the group of items 104 may represent, for example, an order. Additionally, the group of items 104 may comprise items 104 to be packaged together, items 104 that are to be gift wrapped, items 104 that are of a certain weight, items 104 that are of a certain fragility, and/or any other grouping of items 104 that are to undergo similar processing. In some embodiments, the sortation containers 112 may comprise positions on the platform 109, each designated to contain a group of items 104.

Each of the sortation containers 112 may have an identifier 115, which may be uniquely associated with the respective sortation container 112. A scanner 118 may be provided for use in conjunction with a cart 106 to input identifiers 115 on sortation containers 112. In addition, the scanner 118 may also be used to input an identifier 121 of an item 104. Finally, the scanner 118 may be employed to input identifiers 122 from storage locations 103 and/or other identifiers 115, 121, 122. The identifiers 115, 121, 122 may comprise, for example, a barcode, a radio-frequency identifier (RFID), a character string, or any other kind of identifier 115, 121, 122. The identifiers 115, 121, 122 may also comprise, for example, a Universal Product Code (UPC), Global Trade Item Number (GTIN), European Article Number (EAN), International Standard Serial Number (ISSN), International Standard Book Number (ISBN), or other type of item identifier.

A computer system 127 may be employed in the cart 106 and/or in a separate location in data communication with the cart 106. If located separately, the computer system 127 may represent multiple computer systems arranged, for example, in one or more server banks or other arrangements. Such computer systems 127 may be located in a single installation or may be dispersed among many different geographical locations. For example, one or more computer systems 127 may be in the materials handling facility 100, while one or more other computer systems 127 are in other geographical locations. Such computer systems 127 may be distributed, including, for example, a client embedded in the cart 106 in data communication with one or more servers located elsewhere. In other embodiments, a computer system 127 is located only on the cart 106 and operates in a self-contained manner once loaded with data.

For purposes of convenience, the computer system 127 is referred to herein in the singular. However, in one embodiment, the computer system 127 represents a plurality of computer systems arranged as described above. Such computer systems 127 may comprise, for example, processor-based devices having processor circuits comprising a processor and a memory.

In various embodiments, a network may be employed to facilitate data communication among computer systems 127. Such a network may comprise, for example, the Internet, intranets, extranets, wide area networks (WANs), local area networks (LANs), wired networks, wireless networks, or other suitable networks, etc., or any combination of two or more such networks.

The computer system 127 may be configured to execute various applications such as, for example, an order fulfillment application 130, an item placement validation application 133, and other applications. The order fulfillment application 130 may be executed to facilitate inventory control, pick orchestration, control of automated equipment, and other purposes. The item placement validation application 133 may be executed to verify that an item associated with a group of items 104, such as, for example, an order, has been placed in a correct container position on the platform 109 of the cart 106.

Also, the computer system 127 includes a data store 136 and potentially other data stores, comprising, for example, data and applications operable to provide access to the data. The data store 136 may be used to store data including item data 139, order data 142, storage location data 145, cart data 146, and potentially other data. Item data 139 comprises data regarding each item 104, including weight and other characteristics. Order data 142 comprises data about each order including, for example, a group of items 104 to be shipped to a customer in one or more shipments, special handling instructions such as gift wrapping, and/or other order-related data. Storage location data 145 comprises data about each storage location 103 such as, for example, a listing of items 104 stored at each storage location 103 and/or other data. Cart data 146 comprises state information about sortation containers 112 and items 104 placed on the platform 109, previous weight measurements associated with the platform 109, and other cart-related data.

Next, a general description of the operation of the various components of the materials handling facility 100 is provided. To begin with, the order fulfillment application 130 may generate a shipping manifest for a shipment of an order with a listing of a group of items 104 to be packed in that shipment. The order fulfillment application 130 may then assign the shipping manifest to a picker who is, for example, in a zone of the materials handling facility 100 that is convenient to one or more storage locations 103 storing the items 104. The order fulfillment application 130 may further specify the sequence in which items 104 are to be picked from storage locations 103, possibly interleaving items 104 to be picked for different orders or shipments to reduce overall travel time in picking.

A picker obtains a picking assignment, for example, through a display attached to the cart 106, a personal digital assistant (PDA), cell phone, or other computing device in data communication with the order fulfillment application 130. A picking assignment may also be distributed in printed form. The picker then may associate the groups of items 104 to be picked with respective sortation containers 112. In one embodiment, a picker may scan a fixed identifier 115 on the sortation container 112 in order to associate the sortation container 112 with a group of items 104. In another embodiment, an identifier 115 associated with a group of items 104 may be printed, programmed, or otherwise configured and associated with the sortation container 112. In other embodiments, assignments of items 104 to sortation containers 112 may be determined according to one or more rules as items 104 are picked.

The picker is prompted (e.g., by a display attached to the cart 106, a PDA, etc.) to place an item 104 in the appropriate shipping container. The order fulfillment application 130 may direct the picker along an efficient route in the materials handling facility 100 to a particular storage location 103 according to the storage location data 145. The picker moves the cart 106 to the storage location 103 in the materials handling facility 100. In various embodiments, the picker may use scanner 118 to scan an identifier 122 associated with the storage location 103, for example, to confirm that the picker was at the correct storage location 103.

The picker then may retrieve the item 104 from the storage location 103, which may include scanning the identifier 121 on the item 104 with scanner 118 in various embodiments. The picker may scan the identifier 115 on the sortation container 112 in various embodiments. Finally, the picker places the item 104 in the sortation container 112. At this point, the sortation container 112 may already be in a container position on the platform 109 of the cart 106, or the picker may place the sortation container 112 in such a container position.

The item placement validation application 133 may perform initial checks to verify that the identifiers 115, 121, 122 associated with the item 104, sortation container 112, and storage location 103 are the correct identifiers 115, 121, 122 for the group of items 104 being picked. The cart 106 may have an alarm or display to alert the picker that a mistake has potentially been made. Such an alarm may comprise a sound, verbal instructions, a flashing light, a colored light, an error message rendered by a user interface of a computer system 127, and/or any other type of alarm or display.

The picker places the item 104 in a sortation container 112, which has been, or will be placed, in a container position on the platform 109. The item placement validation application 133 then verifies that the item 104 has been placed in a correct sortation container 112 and/or container position on the platform 109. The verification may be based at least in part on a positional requirement associated with the item 104, a weight associated with the item 104 obtained from item data 139, and the weight detected by the load cell configured to measure a weight applied to the platform 109.

The positional requirement defines the association between a group of items 104, or items 104 that are associated with one or more rules, and a sortation container 112 at a container position on the platform 109. When a group of items 104 or a rule is associated with a particular sortation container 112, that sortation container 112 is said to be dedicated to that group of items 104 or rule. In one embodiment, the sortation containers 112 may each be pre-dedicated to a respective group of items 104 or rule before any items 104 are placed in the sortation containers 112. In such a case, the shipping manifest may direct the picker to place an item 104 in a particular one of the sortation containers 112 on the platform 109. In another embodiment, placement of an initial one of a group of items 104 in an empty sortation container 112 at a container position will dedicate the sortation container 112 to the group of items 104. If multiple groups of items 104 are to be loaded onto the platform 109, wherein each group of a subset of the groups has an item 104 or rule in common, placement of the item 104 in an empty sortation container 112 will dedicate that sortation container 112 to the subset of the groups having the item 104 or rule in common. Further items 104 added to the sortation container 112 may differentiate the sortation container 112 so that it is dedicated to fewer or only one of the groups of items 104 or items 104 matching one or more rules.

When one or more sortation containers 112 are dedicated to a particular group of items 104 or one or more rules, items 104 of the group, or items 104 matching the one or more rules, are said to be correctly placed in accordance with the positional requirement when placed in one of the sortation containers 112. In some embodiments, when none of the sortation containers 112 are dedicated to a particular group of items 104, items 104 of the group or items 104 matching the one or more rules are said to be correctly placed in accordance with the positional requirement when placed in a sortation container 112 that is not dedicated to another group or rule.

In some embodiments, the item placement validation application 133 considers the container position on the platform 109 to be equivalent to a sortation container 112 for the purpose of dedicating a sortation container 112 to a group of items 104 or items 104 matching one or more rules. However, in some embodiments, a group of items 104 or items 104 matching one or more rules may need to be placed in a specific sortation container 112 as determined by an identifier 115 of a sortation container 112. Thus, validation of the identifier 115 may be necessary to dedicate a group of items 104, or items 104 matching the one or more rules, to a sortation container 112 at a container position. Additionally, the item placement validation application 133 may allow for movement of a sortation container 112 with a known weight to another container position on the platform 109.

In some embodiments, the weight associated with the item 104 may be used to verify that the correct item 104 is being placed in a sortation container 112 on the platform 109. If the item placement validation application 133 calculates a measured weight of two pounds for an item 104 that is expected to weigh five pounds, an incorrect item 104 may have been placed in the cart 106.

How the item placement validation application 133 determines whether the item 104 is in a correct sortation container 112 will be discussed later in more detail in reference to the specific embodiments shown in FIGS. 2-6. In various embodiments, the item placement validation application 133 may use previous weight measurements from the load cell and previous associations to determine the current state of sortation containers 112 and items 104 on the platform 109. Such information may be stored in and accessed from cart data 146.

If the item placement validation application 133 determines that an item 104 has been incorrectly placed on the platform 109, the item placement validation application 133 may alert the picker by way of an alarm or display. Such an alarm may comprise a sound, verbal instructions, a flashing light, a colored light, an error message rendered by a user interface of a computer system 127, and/or any other type of alarm or display. As a non-limiting example, the item placement validation application 133 may activate a green light when an item 104 is correctly placed or a red light when an item 104 is incorrectly placed.

Figure 2:
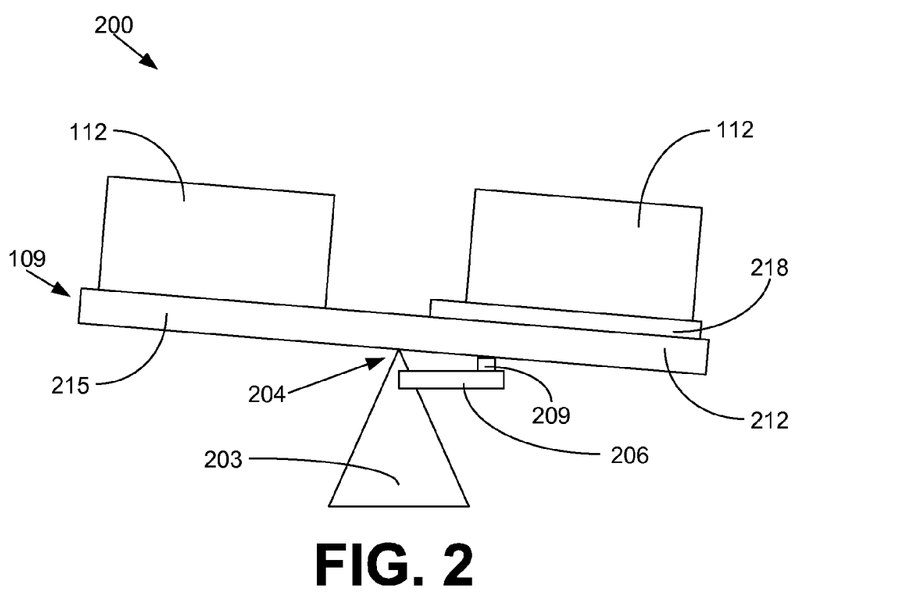
FIGS. 2-6 illustrate examples of item placement validation apparatuses employed in the materials handling facility of FIG. 1 according to various embodiments of the present disclosure.

Referring next to FIG. 2, shown is one example of an item placement validation apparatus 200 employed in the cart 106 (FIG. 1) according to one embodiment. The item placement validation apparatus 200 comprises a base 203 that secures the platform 109 (FIG. 1) to the cart 106. In this embodiment, the base 203 acts as a fulcrum, with platform 109 configured to pivot about the base 203 at pivot point 204.

Attached to the base 203, or to another location in the cart 106, is a load cell attachment member 206 that supports a load cell 209. It is understood that load cell 209 may be any device that is configured to convert a mechanical force, such as a weight, to an electrical signal. Non-limiting examples of load cells 209 include strain gauge load cells, piezo-electric load cells, vibrating wire load cells, s-beam load cells, pneumatic load cells, hydraulic load cells, hydrostatic load cells, torque sensors, and/or any other suitable transducer. The depiction of the load cell 209 and load cell attachment member 206 is merely one example of numerous such configurations and is not intended to be limiting.

The pivot point 204 divides the platform 109 into two portions: a preloaded portion 212 and a non-preloaded portion 215. A sortation container 112 is disposed on each of the preloaded portion 212 and non-preloaded portion 215. The load cell 209 is configured to measure the weight placed on the preloaded portion 212 less the weight placed on the non-preloaded portion 215. This balance beam configuration enables the item placement validation apparatus 200 to measure the weights of two sortation containers 112 (FIG. 1) with only one load cell 209. Note that, in this embodiment, precise positioning of the items 104 on the platform 109 is unnecessary because each side of the platform 109 is configured to accommodate one sortation container 112. Accordingly, the item placement validation apparatus 200 is configured to account for variations in the size or the center of mass of a sortation container 112.

However, in this embodiment, the preloaded portion 212 is preloaded with a preload weight 218 that defines a maximum allowable weight for a first item 104 (FIG. 1) to be placed on the non-preloaded portion 215. Because the embodiment of FIG. 2 is not configured to measure a negative weight in load cell 209 (i.e., where the weight on the non-preloaded portion 215 exceeds the weight on the preloaded portion 212), order fulfillment application 130 (FIG. 1) may direct picking so that the weight expected to be placed on the preloaded portion 212 always exceeds the weight expected to be placed on the non-preloaded portion 215. Accordingly, the preload weight 218 may be absent when directed picking is used. In other embodiments, preloading may not be necessary (e.g., when a load cell 209 comprises an s-beam load cell that can measure tension and/or compression).

The item placement validation application 133 (FIG. 1) tracks the previous weight measured by the load cell 209 to determine the weight of an item 104 added to one of the sortation containers 112. If the change in weight measured by the load cell 209 is positive, the item placement validation application 133 determines that the item 104 has been added to the sortation container 112 on the preloaded portion 212. If the change in weight measured by the load cell 209 is negative, the item placement validation application 133 determines that the item 104 has been added to the non-preloaded portion 215. The item placement validation application 133 compares the change in weight with the expected weight associated with the item 104 to determine if the correct item 104 has been added.

The weight measured by the load cell 209 may vary for the same items 104 due to the placement of items 104 within a sortation container 112 or the placement of the sortation container 112 on the platform 109. However, the item placement validation application 133 is configured to make decisions based on ranges of weight measured by the load cell 209 within a margin of error to take the variation of weight measurements for a single sortation container 112 into account.

If the item placement validation application 133 has dedicated a sortation container 112 at a container position to a group of items 104, the item placement validation application 133 determines if the item 104 has been placed correctly. Otherwise, if no sortation container 112 has been dedicated, the item placement validation application 133 may dedicate the sortation container 112 at the container position (i.e., the preloaded portion 212 or the non-preloaded portion 215) to the group of items 104 associated with the newly added item 104. Sortation containers 112 may initially be empty and undedicated with the placement of items 104 triggering a dedication to a group of items 104, or the sortation containers 112 may be empty and dedicated for a group of items 104 (e.g., if a particular sortation container 112 has an identifier 115 that is associated with the group of items 104).

The item placement validation application 133 may receive input from the picker as to which sortation container 112 or group of items 104 is at a particular container position in order to dedicate that container position or otherwise to update an internal state regarding which sortation container 112 is at which container position. In one embodiment, the item placement validation application 133 learns which sortation container 112 is at which container position as the identifier 115 of a sortation container 112 is scanned and the sortation container 112 is initially placed on the platform 109.

Figure 3:
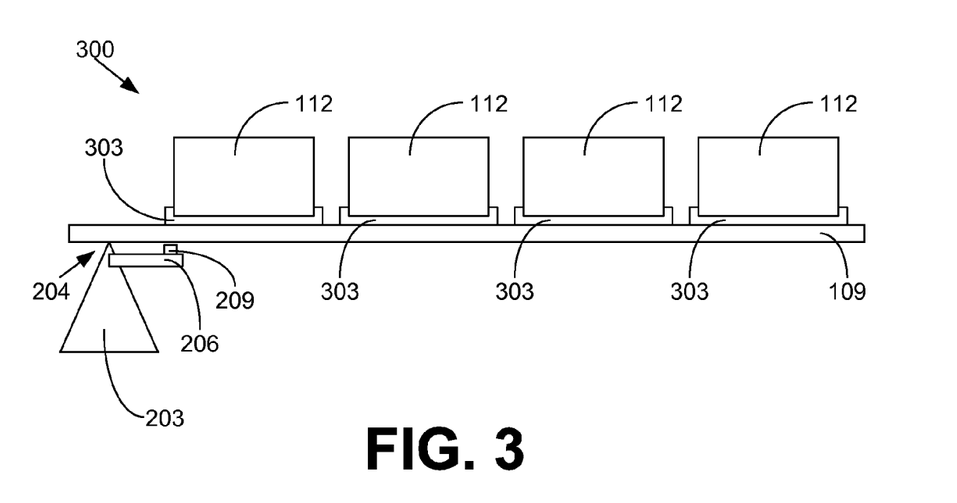

Turning now to FIG. 3, shown is another example of an item placement validation apparatus 300 employed in the cart 106 (FIG. 1) according to one embodiment. Item placement validation apparatus 300 comprises a base 203 (FIG. 2) that secures the platform 109 (FIG. 1) to the cart 106. In this embodiment, the base 203 is configured to support the platform 109 and allow a downward displacement of the platform 109 from the pivot point 204 (FIG. 2) that is detected by the load cell 209 (FIG. 2). The load cell 209 is supported by a load cell attachment member 206 (FIG. 2) that is attached to the base 203 or to another location in the cart 106.

The item placement validation apparatus 300 can permit the weight measurement of each of any number of sortation containers 112 (FIG. 1). To this end, disposed on the platform 109 are a plurality of container positions 303. Each container position 303 is sized and configured to receive one or more sortation containers 112. The sizes of the container positions 303 may vary with respect to one another to accommodate sortation containers 112 of different shapes and sizes. As illustrated in FIG. 3, a container position 303 may be a receptacle for a sortation container 112. However, in other embodiments, a container position 303 may comprise merely a visual indication on the platform 109 or may even exist only logically, for example, as a division of the platform 109 into fourths or according to some other division.

In this embodiment, the container positions 303 are arranged in increasing distance from the pivot point 204. Each container position 303 will be associated with a different moment for the same weight. The moment is the product of force (i.e., a weight) and a directed distance along an axis (i.e., the distance from the pivot point 204 along the platform 109). Therefore, the same item 104 (FIG. 1) will appear to have a different weight at the load cell 209 when the item 104 is placed in each of the container positions 303. The item placement validation application 133 has the expected weight associated with the item 104 and the distance from the pivot point 204 to the container positions 303 and can solve for the expected weight of the item 104 at each of the container positions 303. This enables the item placement validation application 133 to verify both that the correct item 104 was placed on the platform 109 and that the item 104 was placed in the correct sortation container 112.

Note that the center of mass of the item 104 may not be at a reference location within a container position 303 on the platform 109. Instead, the center of mass of the item 104 will be bounded within the respective container position 303, thereby introducing a potential variation in position within the container position 303 relative to the pivot point 204 that is taken into account by the item placement validation application 133 when solving for the weight or position of the item 104. In other words, the weight detected by the load cell 209 will vary within a certain range for each container position 303 for a respective item 104. The item placement validation application 133 may not be able to distinguish two sortation containers 112 placed side by side within a single container position 303 such that the areas associated with both sortation containers 112 are co-equal along the platform 109 from the pivot point 204. Such a configuration would be better addressed by the embodiments of FIGS. 5 and 6.

Figure 4:
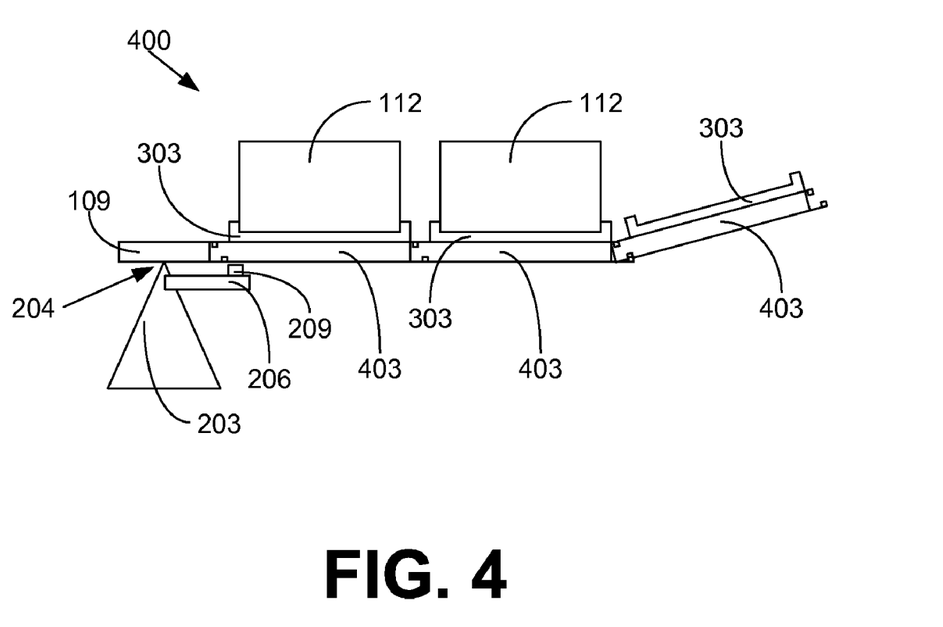

Moving next to FIG. 4, shown is another example of an item placement validation apparatus 400 employed in the cart 106 (FIG. 1) according to one embodiment. Item placement validation apparatus 400 differs from item placement validation apparatus 300 (FIG. 3) in that the platform 109 (FIG. 1) is modular. The platform 109 comprises a plurality of modular portions 403 that interconnect, allowing modular portions 403 to be added or removed from the platform 109. Consequently, the number of container positions 303 (FIG. 3) is configurable. In some embodiments, each modular portion 403 may be integral with a container position 303 and a sortation container 112 (FIG. 1). Thus, the sortation containers 112 themselves may interconnect to form the platform 109.

In one embodiment, the item placement validation application 133 (FIG. 1) receives a signal that indicates the number of modular portions 403 forming the platform 109. In other embodiments, the item placement validation application 133 verifies item 104 (FIG. 1) placement with the number of container positions 303 (FIG. 3) being a solution variable. For example, if an item 104 is placed in a container position 303 that was recently added, the item placement validation application 133 may assume a modular portion 403 was added because none of the previously detected container positions 303 match the solution parameters. In such a case, the item placement validation application 133 may not be certain whether the item 104 has been placed correctly and may need further data (i.e., additional item placements) to verify that the modular portion 403 has been connected. Accordingly, an alert for misplacement of an item 104 may be delayed depending on the degree of error relative to possible solutions.

The item placement validation application 133 may include a cart calibration routine for a cart 106 including modular portions 403. A cart calibration routine would enable the item placement validation application 133 to learn the new configuration of platform 109 based on the empty weight of the platform 109. A user may recalibrate the cart 106 after all modular portions 403 are added when all of the modular portions 403 are the same weight and are on the same side of the pivot point 204 (FIG. 2). If modular portions 403 are of different weights, such a cart calibration routine may involve recalibration after each of the modular portions 403 are attached to the cart 106. If modular portions 403 are to be added on both sides of a pivot point 204, then modular portions 403 may be added to the preloaded side (i.e., the side with the load cell 209 (FIG. 2)) such that the preloaded side is kept heavier than the non-preloaded side. As a non-limiting example, the cart 106 may include a button to trigger the cart calibration routine.

Figure 5:
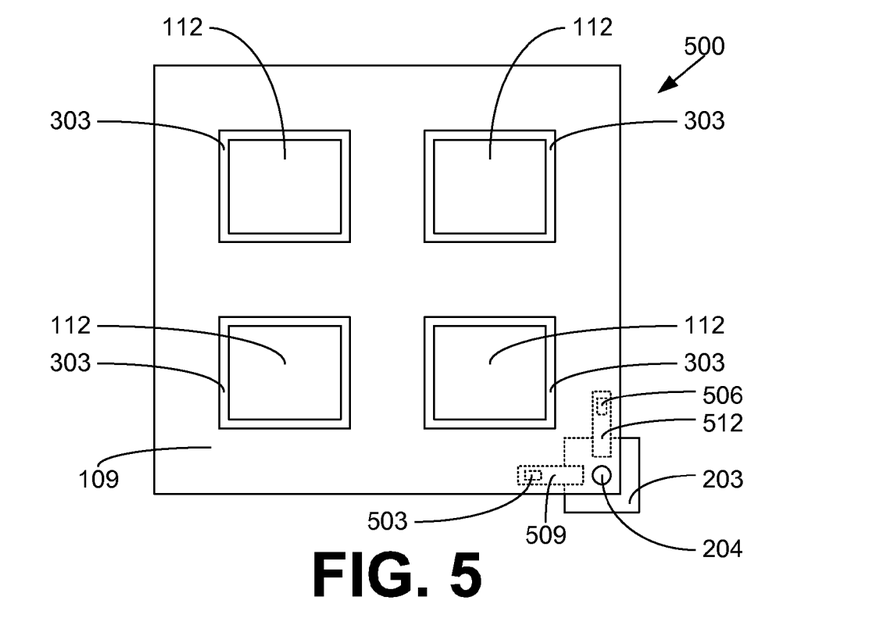

With reference now to FIG. 5, shown is another example of an item placement validation apparatus 500 employed in the cart 106 (FIG. 1) according to one embodiment. The item placement validation apparatus 500 functions similarly to the item placement validation apparatus 300 (FIG. 3) but instead includes two load cells 503, 506. The load cells 503, 506 are supported by load cell attachment members 509, 512 attached to the base 203 (FIG. 2).

The item placement validation apparatus 500 is effectively a two-dimensional extension of item placement validation apparatus 300. The load cell 503 is configured to measure a weight causing displacement of the platform 109 (FIG. 1) along the X axis, while the load cell 506 is configured to measure a weight causing displacement of the platform 109 along the Y axis. In such embodiments, a moment may be determined for each of the two axes, allowing the item placement validation application 133 (FIG. 1) to solve for the container position 303 (FIG. 3) based on distance along the respective axis from the pivot point 204 (FIG. 2), measured weight of the item 104 (FIG. 1), and/or other variables.

The shape and configuration of the platform 109 may vary. For example, FIG. 5 depicts a platform 109 having a rectangular shape and with the container positions 303 on the platform 109 in a grid arrangement. In other embodiments, the platform 109 may be disk shaped or have some other shape. Also, in other embodiments, the container positions 303 may be in a radial arrangement or be in some other arrangement. In some embodiments, the platform 109 may be modular as in FIG. 4.

Figure 6:
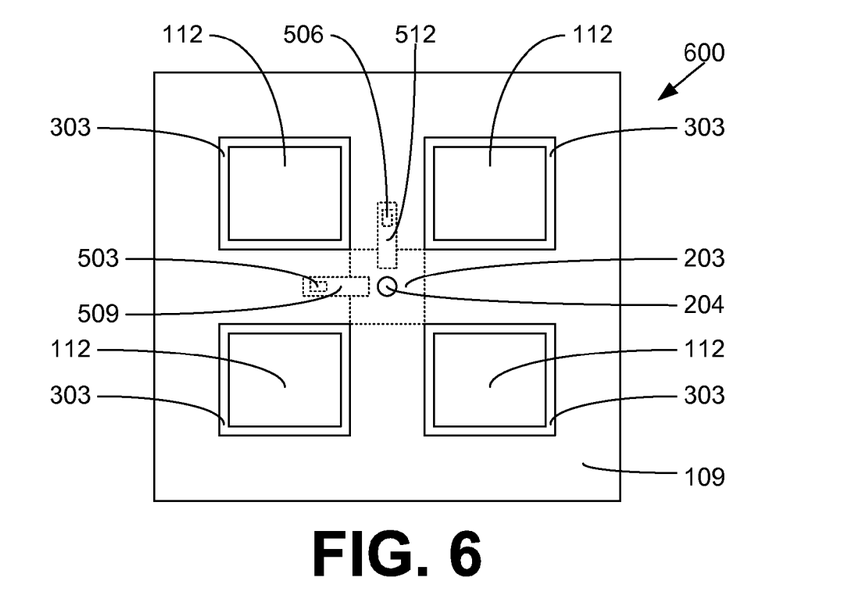

Referring next to FIG. 6, shown is another example of an item placement validation apparatus 600 employed in the cart 106 (FIG. 1) according to one embodiment. The item placement validation apparatus 600 comprises a combination of the features of item placement validation apparatus 200 (FIG. 2) and item placement validation apparatus 500 (FIG. 5). The base 203 (FIG. 2) has been shifted toward the center of the platform 109 (FIG. 1) so that the base 203 acts as a fulcrum and the platform 109 pivots about the base 203 at pivot point 204 (FIG. 2) in both the X axis and the Y axis. Thus, the item placement validation apparatus 600 extends item placement validation apparatus 200 to function in a two-dimensional manner.

As in FIG. 2, a portion of the platform 109 is preloaded. The upper left quadrant of the platform 109 in FIG. 6 may comprise this preloaded portion 212 (FIG. 2). The measurements of both load cells 503, 506 (FIG. 5) are used to determine in which of the sortation containers 112 (FIG. 1) an item 104 (FIG. 1) has been placed. As a non-limiting example, suppose that an item 104 is placed in the sortation container 112 at the upper left. The weights detected by the load cells 506 and 512 will increase over the previous readings. If, instead, the item 104 is placed in the sortation container 112 at the upper right, the weight detected by load cell 506 will decrease, while the weight detected by load cell 512 will increase. If the item 104 is placed in the sortation container 112 at the lower left, the weight detected by load cell 506 will increase, while the weight detected by load cell 512 will decrease. Finally, if the item 104 is placed in the sortation container 112 at the lower right, the weights detected by the load cells 506 and 512 will both decrease compared to the previous readings. In this way, the item placement validation application 133 (FIG. 1) may determine into which sortation container 112 an item 104 has been placed and the weight of the item 104.

The item placement validation apparatus 600 may include a larger platform 109 with additional container positions 303 (FIG. 3) like item placement validation apparatus 500 (FIG. 5). In such embodiments, the item placement validation application 133 may use the moments associated with the container positions 303 and the expected weight of the item 104 to determine at which container position 303 the item 104 has been added. Like item placement validation apparatus 500, item placement validation apparatus 600 may be modular and may have a platform 109 shaped like a disk or some other shape. Like item placement validation apparatus 500, item placement validation apparatus 600 may have the container positions 303 in a grid arrangement, radial arrangement, or some other arrangement. Like item placement validation apparatus 400, item placement validation apparatus 600 may be modular.

Figure 7:
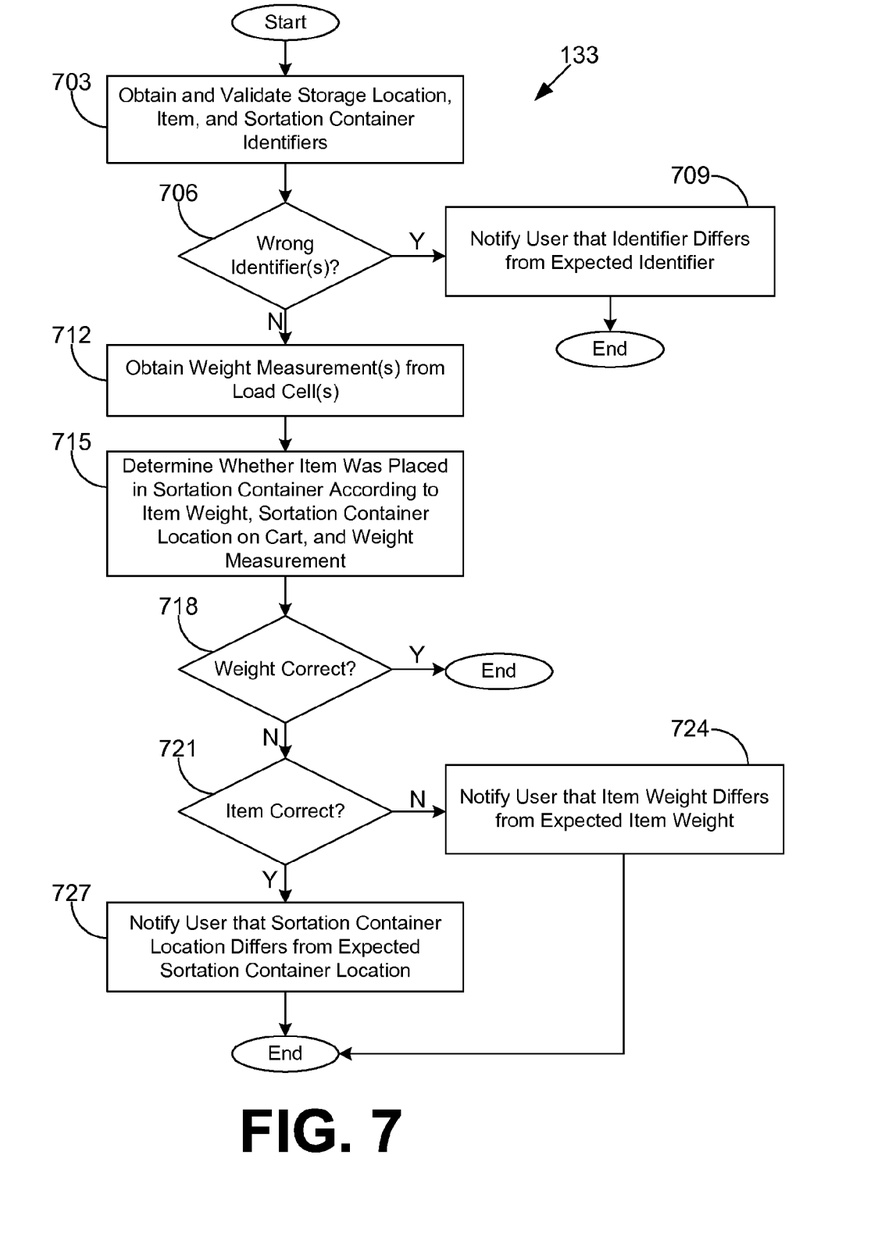
FIGS. 7 and 8 are flowcharts illustrating examples of functionality implemented as portions of an item placement validation application executed in a computer system employed in the materials handling facility of FIG. 1 according to various embodiments of the present disclosure.

Moving on to FIG. 7, shown is a flowchart that provides one example of the operation of a portion of the item placement validation application 133 (FIG. 1) according to various embodiments. It is understood that the flowchart of FIG. 7 provides merely an example of the many different types of functional arrangements that may be employed to implement the operation of the portion of the item placement validation application 133 as described herein. As an alternative, the flowchart of FIG. 7 may be viewed as depicting an example of steps of a method implemented in the computer system 127 (FIG. 1) according to one or more embodiments.

Beginning with box 703, the item placement validation application 133 obtains and validates identifiers 115, 121, 122 (FIG. 1) for a storage location 103 (FIG. 1), an item 104 (FIG. 1), and a sortation container 112 (FIG. 1). These identifiers 115, 121, 122 are scanned by the picker when the picker is completing a picking assignment. Validation of these identifiers 115, 121, 122 provides an initial check whether the correct item 104 was picked from the correct storage location 103 and that the correct sortation container 112 is identified. In box 706, the item placement validation application 133 determines whether one or more wrong identifiers 115, 121, 122 were scanned. If so, then in box 709, the item placement validation application 133 notifies the picker that the identifier 115, 121, 122 differs from the expected identifier 115, 121, 122. The item placement validation application 133 then ends.

Otherwise, in box 712, the item placement validation application 133 obtains one or more weight measurements of the platform 109 (FIG. 1) from one or more load cells 209 (FIG. 2). Then, in box 715, the item placement validation application 133 determines whether the item 104 was placed in the sortation container 112 according to the weight of the item 104, the sortation container 112 location on the platform 109 of the cart 106 (FIG. 1), and the measured weight from the load cells 209. The determination will also depend on the characteristics of the particular embodiment of the platform 109 apparatus such as, for example, the embodiments depicted in FIGS. 2-6.

In box 718, the item placement validation application 133 determines whether the weight detected by the load cells 209 was correct. In other words, the item placement validation application 133 determines whether there is a combination of an expected weight of an item 104 and correct container position 303 (FIG. 3) such that the detected weight would be valid. If so, the placement is correct, and in some embodiments, the item placement validation application 133 may indicate a correct placement to the user. The item placement validation application 133 then ends.

If in box 718 the item placement validation application 133 determines that the detected weight is not correct, the item placement validation application 133 moves to box 721 and determines whether the item 104 placed on the platform 109 is the correct item 104 according to the weight measured. If not, in box 724, the item placement validation application 133 notifies the picker that the weight of the item 104 placed on the platform 109 differs from the expected weight of item 104. In such a case, it is possible that an incorrect item 104 was placed on the platform 109 due to a mistake made by the picker, mislabeling/misidentification, incorrect weight data in item data 139 (FIG. 1), and/or some other reason. The item placement validation application 133 then ends.

If, in box 721, the item placement validation application 133 determines that the measured weight correctly corresponds to the item 104, then the item placement validation application 133 moves to box 727 and notifies the picker that the location of the sortation container 112 where the item 104 was placed differs from the expected location of the correct sortation container 112. Then, the item placement validation application 133 ends.

Figure 8:
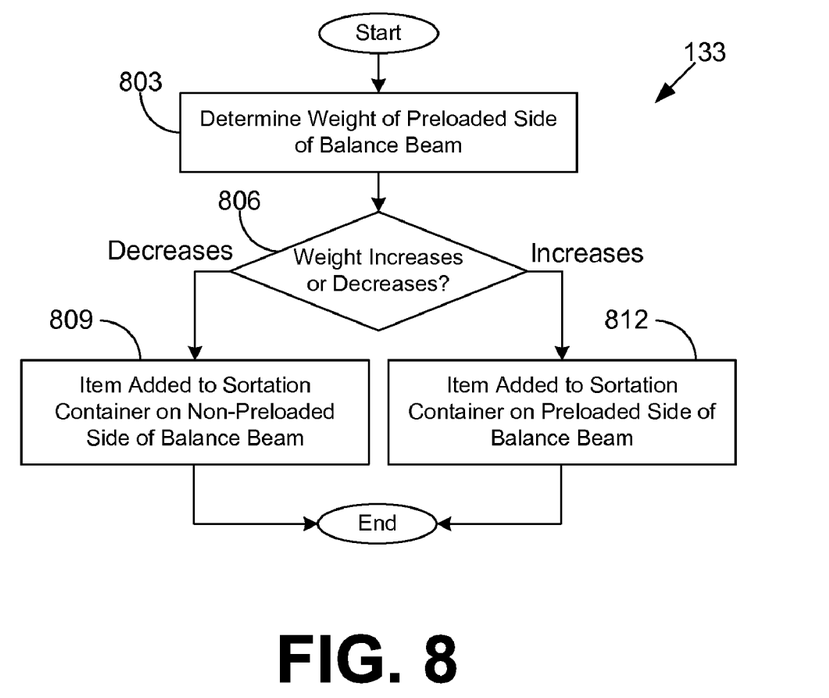

With reference to FIG. 8, shown is a flowchart that provides one example of the operation of another portion of the item placement validation application 133 (FIG. 1) according to various embodiments. It is understood that the flowchart of FIG. 8 provides merely an example of the many different types of functional arrangements that may be employed to implement the operation of the portion of the item placement validation application 133 as described herein. As an alternative, the flowchart of FIG. 8 may be viewed as depicting an example of steps of a method implemented in the computer system 127 (FIG. 1) according to one or more embodiments. Specifically, the flowchart of FIG. 8 corresponds to logic implementing the item placement validation application 133 associated with the item placement validation apparatus 200 (FIG. 2).

Beginning with box 803, the item placement validation application 133 determines the weight of a preloaded side of the balance beam (i.e., the preloaded portion 212 (FIG. 2) of the platform 109 (FIG. 1)). The preload weight 218 (FIG. 2) may be determined as the initial reading of the load cell 209 (FIG. 2), or the order fulfillment application 130 (FIG. 1) may direct picking such that items 104 (FIG. 1) are added to the preloaded portion 212 first. In box 806, the item placement validation application 133 determines whether the weight measured by the load cell 209 has increased or decreased relative to the previous reading. If the weight has decreased, the item placement validation application 133 moves to box 809 and determines that an item 104 was added to a sortation container 112 (FIG. 1) on the non-preloaded side of the balance beam (i.e., the non-preloaded portion 215 (FIG. 2) of the platform 109). Then, the item placement validation application 133 ends.

Otherwise, if the item placement validation application 133 determines in box 806 that the weight detected by the load cell 209 has increased, the item placement validation application 133 moves to box 812 and determines that the item 104 was added to a sortation container 112 on the preloaded side of the balance beam. The item placement validation application 133 then ends.

Figure 9:
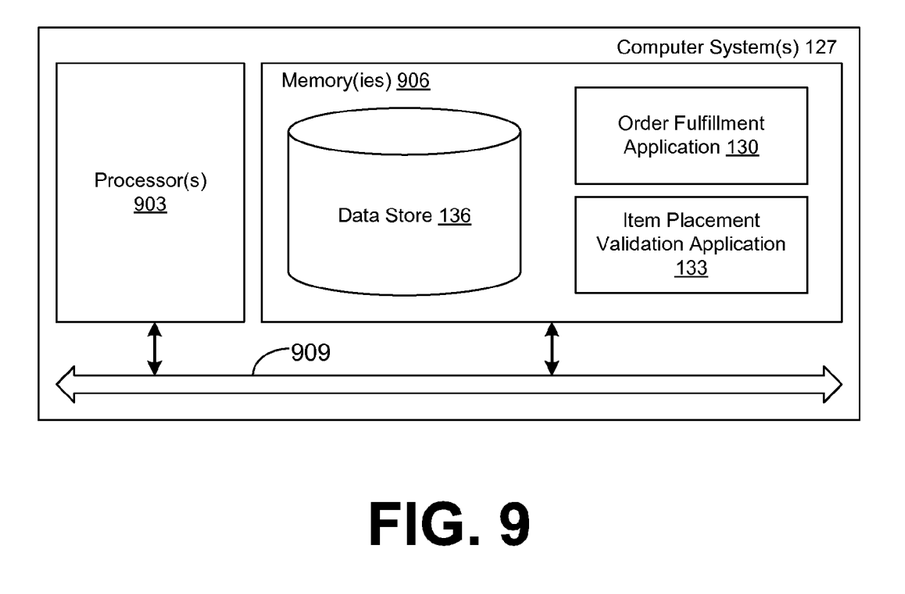
FIG. 9 is a schematic block diagram that provides one example illustration of a computer system employed in the materials handling facility of FIG. 1 according to various embodiments of the present disclosure.

Referring next to FIG. 9, shown is a schematic block diagram of the computer system 127 (FIG. 1) according to an embodiment of the present disclosure. The computer system 127 includes a processor circuit, for example, having a processor 903 and a memory 906, both of which are coupled to a local interface 909. The local interface 909 may comprise, for example, a data bus with an accompanying address/control bus or other bus structure as can be appreciated.

Stored in the memory 906 are both data and several components that are executable by the processor 903. In particular, stored in the memory 906 and executable by the processor 903 are an order fulfillment application 130 (FIG. 1), an item placement validation application 133 (FIG. 1), and potentially other applications. Also stored in the memory 906 may be a data store 136 (FIG. 1) and other data. In addition, an operating system may be stored in the memory 906 and executable by the processor 903.

It is understood that there may be other applications that are stored in the memory 906 and are executable by the processors 903 as can be appreciated. Where any component discussed herein is implemented in the form of software, any one of a number of programming languages may be employed such as, for example, C, C++, Java, Java Script, Perl, Python, Flash, or other programming languages.

A number of software components are stored in the memory 906 and are executable by the processor 903. In this respect, the term "executable" means a program file that is in a form that can ultimately be run by the processor 903. Examples of executable programs may be, for example, a compiled program that can be translated into machine code in a format that can be loaded into a random access portion of the memory 906 and run by the processor 903, source code that may be expressed in proper format such as object code that is capable of being loaded into a random access portion of the memory 906 and executed by the processor 903, or source code that may be interpreted by another executable program to generate instructions in a random access portion of the memory 906 to be executed by the processor 903, etc. An executable program may be stored in any portion or component of the memory 906 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 906 is defined herein as including both volatile and nonvolatile memory and data storage components. Volatile components are those that do not retain data values upon loss of power. Nonvolatile components are those that retain data upon a loss of power. Thus, the memory 906 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 903 may represent multiple processors 903 and the memory 906 may represent multiple memories 906 that operate in parallel processing circuits, respectively. In such a case, the local interface 909 may be an appropriate network that facilitates communication between any two of the multiple processors 903, between any processor 903 and any of the memories 906, or between any two of the memories 906, etc. The local interface 909 may comprise additional systems designed to coordinate this communication, including, for example, performing load balancing. The processor 903 may be of electrical or of some other available construction.

Although the order fulfillment application 130, the item placement validation application 133, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 7 and 8 show the functionality and operation of an implementation of portions of the item placement validation application 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 and 8 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the order fulfillment application 130 and the item placement validation application 133, that comprises software or code can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A system, comprising:
   a platform with a plurality of container positions, the platform configured to pivot about a base, the base dividing the platform into a first portion and a second portion, with at least one of the container positions being on each of the first portion and the second portion;
   a first load cell configured to measure a weight applied to the first portion along a first axis less a weight applied to the second portion along the first axis;

a second load cell configured to measure a weight applied to the first portion along a second axis less a weight applied to the second portion along the second axis;

at least one computer system, including a processor circuit and a memory; and an item placement validation application executable in the at least one computer system, the item placement validation application comprising logic that verifies that an item associated with a group of items has been placed in a correct one of the container positions based at least in part on the group of items, a location of each one of the container positions relative to the first load cell and the second load cell, a weight associated with the item, the weight detected by the first load cell, and the weight detected by the second load cell.

2. A system, comprising:
a platform with a plurality of container positions;
a single load cell configured to measure a weight applied to the platform, wherein the single load cell simultaneously detects a weight applied in a plurality of the container positions; and
a system that verifies that an item has been placed in a correct one of the container positions based at least in part on a positional requirement associated with the item, a weight associated with the item, and the weight detected by the single load cell.

3. The system of claim 2, wherein the positional requirement is based at least in part on at least one rule associated with the item.

4. The system of claim 2, wherein the positional requirement is based at least in part on a group of items, where the item is associated with the group of items.

5. The system of claim 4, wherein the positional requirement is based at least in part on a container position dedicated to the group of items.

6. The system of claim 2, further comprising a processor circuit and a memory.

7. The system of claim 2, wherein the weight associated with the item is obtained from at least one server.

8. The system of claim 2, wherein the system that verifies performs the verification in at least one server.

9. The system of claim 2, wherein each one of the container positions is configured to receive at least one sortation container.

10. The system of claim 9, wherein the at least one sortation container is selected from a group consisting of: a tote, a bag, a bin, or a box.

11. The system of claim 2, wherein the system that verifies determines in which one of the container positions the item has been placed based at least in part on a previous weight measured by the single load cell.

12. The system of claim 2, wherein the system that verifies determines in which one of the container positions the item has been placed based at least in part on the container positions, the weight associated with the item, and the weight detected by the single load cell.

13. The system of claim 2, wherein the platform is modular and configured to receive at least one additional container position.

14. A system, comprising:
a platform with a plurality of container positions;
a load cell configured to measure a weight applied to the platform;
a system that verifies that an item has been placed in a correct one of the container positions based at least in part on a positional requirement associated with the item, a weight associated with the item, and the weight detected by the load cell; and
wherein the platform is configured to pivot about a base that divides the platform into a first portion and a second portion, with at least one of the container positions being on each of the first portion and the second portion, wherein the load cell is configured to measure a weight placed on the first portion less a weight placed on the second portion.

15. The system of claim 14, wherein the first portion is preloaded with a preload weight defining a maximum allowable weight for a first item to be placed on the second portion.

16. The system of claim 14, further comprising a system that directs placement of at least one item so that the first portion is preloaded.

17. A system, comprising:
a platform with a plurality of container positions;
a first load cell configured to measure a weight applied to the platform;
a system that verifies that an item has been placed in a correct one of the container positions based at least in part on a positional requirement associated with the item, a weight associated with the item, and the weight detected by the first load cell; and
a second load cell configured to measure a weight causing displacement of the platform along a first axis, wherein the first load cell is configured to measure a weight causing displacement of the platform along a second axis.

18. The system of claim 17, wherein the system that verifies determines in which one of the container positions the item has been placed based at least in part on the container positions, the weight associated with the item, the weight detected by the first load cell, and the weight detected by the second load cell.

19. The system of claim 17, wherein the container positions are arranged on the platform in a grid arrangement.

20. The system of claim 17, wherein the container positions are arranged on the platform in a radial arrangement.

21. A method for determining placement of an item on a platform having a single load cell configured to measure weight applied to the platform, the method comprising the steps of:
simultaneously detecting, by the single load cell, a weight applied to the platform in a plurality of container positions on the platform; and
verifying that the item has been placed in a correct one of the container positions based at least in part on a positional requirement associated with the item, a weight associated with the item, and the weight detected by the single load cell.

22. The method of claim 21, further comprising the step of determining in which one of the container positions the item has been placed based at least in part on the container positions, the weight associated with the item, and the weight detected by the single load cell.

23. The method of claim 21, wherein the platform is modular and configured to receive at least one additional container position.

24. A method for determining placement of an item on a platform having a load cell configured to measure weight applied to the platform, the method comprising the step of:
verifying that the item has been placed in a correct one of a plurality of container positions on the platform based at least in part on a positional requirement associated with the item, a weight associated with the item, and the weight detected by the load cell; and wherein the platform is configured to pivot about a base that divides the platform into a first portion and a second portion, at least one of the container positions being on each of the first portion and the second portion, wherein the load cell is configured to measure a weight placed on the first portion less a weight placed on the second portion.

25. The method of claim 24, further comprising the step of preloading the first portion with a preload weight defining a maximum allowable weight for a first item to be placed on the second portion.

26. The method of claim 25, wherein the preloading step further comprises the step of directing placement of at least one item so that the first portion is preloaded.

27. The method of claim 24, further comprising the step of determining in which one of the container positions the item has been placed based at least in part on a previous weight measured by the load cell.

28. A method for determining placement of an item on a platform having a first load cell configured to measure weight applied to the platform, the method comprising the step of:
   verifying that the item has been placed in a correct one of a plurality of container positions on the platform based at least in part on a positional requirement associated with the item, a weight associated with the item, and the weight detected by the load cell; and
   wherein the platform has a second load cell configured to measure a weight causing displacement of the platform along a first axis, wherein the first load cell is configured to measure a weight causing displacement of the platform along a second axis.

29. The method of claim 28, further comprising the step of determining in which one of the container positions the item has been placed based at least in part on the container positions, the weight associated with the item, the weight detected by the first load cell, and the weight detected by the second load cell.

30. A method, comprising:
   obtaining an item from a storage location, the item being associated with a group of items to be placed in a correct sortation container;
   placing the item in one of a plurality of sortation containers on a cart, each of the sortation containers being positioned on a platform; and
   obtaining an indication from the cart whether the one of the sortation containers is the correct sortation container for the item, the indication based at least in part on the group, a position of the one of the sortation containers on the platform, a weight associated with the item, and a weight detected by a single load cell configured to simultaneously measure weight applied to the platform in a plurality of sortation container positions of the platform.

31. The method of claim 30, wherein the group of items comprises items that are associated with at least one rule.

* * * * *